July 22, 1952  A. C. CREASEY  2,604,330
HOBBYHORSE
Filed June 26, 1950  2 SHEETS—SHEET 1
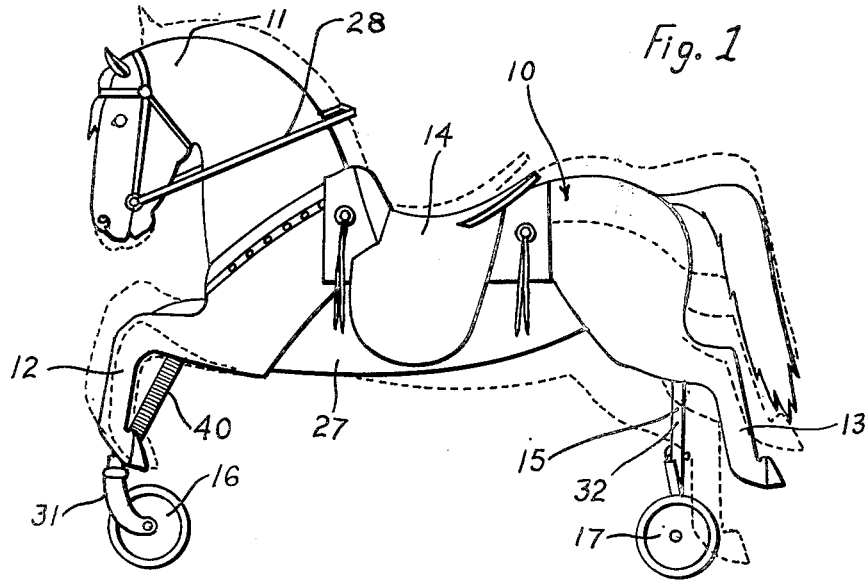
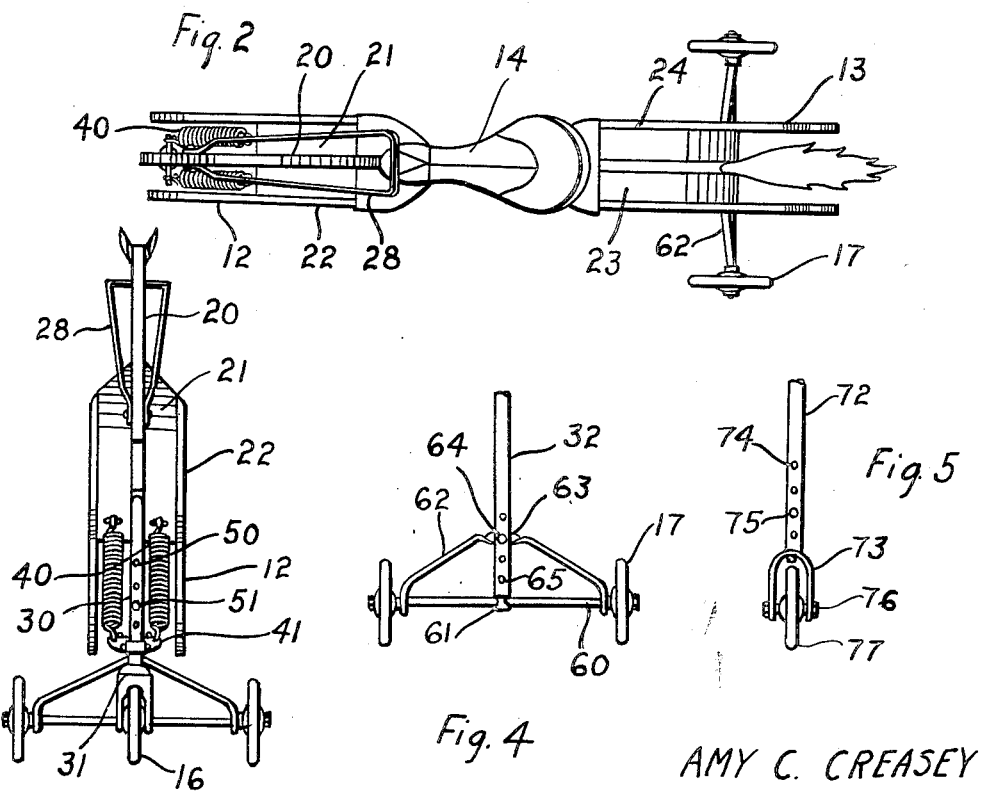
AMY C. CREASEY
INVENTOR.
BY Fulwider & Mattingly
ATTORNEYS July 22, 1952  A. C. CREASEY  2,604,330
HOBBYHORSE Filed June 26, 1950  2 SHEETS—SHEET 2

AMY C. CREASEY
INVENTOR.

Patented July 22, 1952

2,604,330

UNITED STATES PATENT OFFICE 2,604,330

HOBBYHORSE

Amy C. Creasey, Los Angeles, Calif., assignor of one-half to Charles L. Johnson, Los Angeles, Calif.

Application June 26, 1950, Serial No. 170,323

5 Claims. (Cl. 280—1.188)

My invention relates generally to children's vehicles, and more particularly to a vehicle of this character which incorporates therein a simple and easily operated hobby horse.

Although most hobby or rocking horses are mounted on fixed bases, attempts have been made to combine such devices with children's scooters or cycles. Many of the proposed devices are complex, expensive, and of such nature as to require more than ordinary propelling force. Still others fail to provide the natural galloping motion associated with live horses, and are consequently not interesting to the child.

The preferred embodiment of my invention is a cycle on which the rider propels himself forwardly with a scooter-like action. As he does so, the body of the device responds with a galloping or springing gait, the resultant motion being entirely natural and requiring no directed effort or attention. For this reason the device is very advantageous for small children, who are delighted by the movement of the vehicle and are too small to be able to operate a more complex mechanism.

The device is guided by reins much in the manner of a live horse, and is otherwise constructed and equipped to suit the fancy of a small cowboy. The body of the horse is durable and safe, and is simply made without sacrificing its realistic appearance. The gait of the horse may be easily adjusted to meet the requirements of riders of different sizes and weights, and is responsive to the activity of the rider, increasing in tempo to correspond with his exuberance.

Accordingly, as can be understood from the aforesaid, it is a major object of my invention to provide a child's vehicle which is easily ridden and has a natural galloping motion.

Another object of my invention is to provide a hobby horse which is guided by reins much in the manner of a live horse.

A further object of my invention is to provide a vehicle which is durable and practical for use by children.

It is also an object of my invention to provide adjustment means so that the gait of the horse can be changed for different size riders.

Still another object of my invention is to provide a lightweight construction which improves the riding qualities of the device without sacrificing its realistic appearance, and which is economically manufactured.

These and other objects and advantages of my invention will become apparent from the following description of preferred and modified forms thereof, and from an inspection of the accompanying drawings in which:

Fig. 1 is a side elevation of a preferred embodiment of my invention;

Fig. 2 is a top plan view of the preferred form;

Fig. 3 is a front elevation of the same;

Fig. 4 is a partial rear elevation showing the rear wheel assembly;

Fig. 5 is a detail showing a modified rear wheel assembly;

Figure 6:
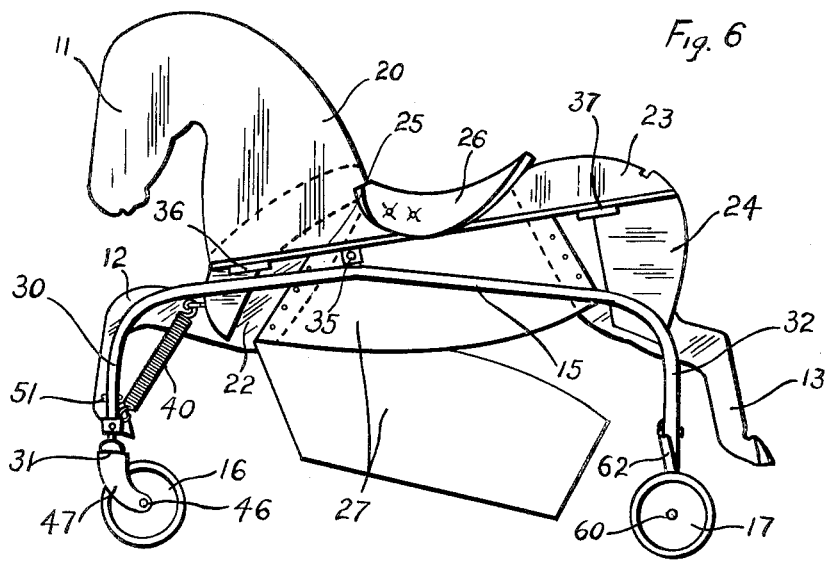
Fig. 6 is a side elevation, partially in cross-section, showing the interior construction.

Referring now to the drawings and particularly to Figs. 1 and 6 thereof, the numeral 10 indicates generally the body of the device which is preferably shaped as a horse or the like, having a head 11, front legs 12, and rear legs 13. Centrally mounted on the body 10 is a saddle 14 in which the rider sits so that his legs may extend down and engage the supporting surface. The body 10 is pivotally mounted on a lower frame 15 which passes longitudinally through the body and is supported by a front wheel 16 and a pair of rear wheels 17. As the rider propels himself forwardly by engaging his feet on the supporting surface, the body 10 moves pivotally or gallops, assuming periodically the positions shown in the phantom outline of Fig. 1. The device may be modified by the addition of a pedal-operated propelling mechanism, but the preferred form has been found especially desirable for small children.

Figures 7, 8:
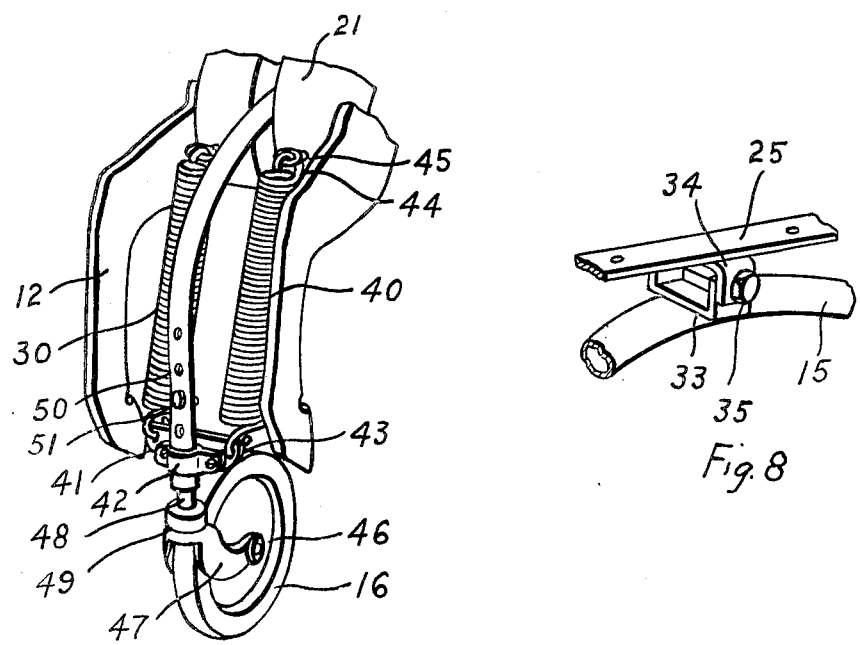
Fig. 7 is a partial perspective view showing the front spring assembly.
Fig. 8 is a detail showing the pivot construction.

The body 10 is formed of lightweight material such as wood or molded rubberized fabric providing a low center of gravity. As seen in Figs. 2 and 6, the body 10 is built-up from an upper vertical plate 20, shaped to form the head 11 and the back of the horse. Blocks 21 are attached forwardly on the plate 20 to form the chest of the horse, and spaced parallel plates 22 are fastened to the outside of the blocks 21 and extend downwardly so as to provide foreshanks. The legs 12 are formed integrally with the shanks 22, and extend forwardly and downwardly a substantial distance apart as is best seen in Fig. 7. The rear portion of the body 10 is formed by blocks 23 fastened to the plate 20 and joined to spaced side plates 24 extending downwardly to form the rear legs 13. Firmly secured to the bottom of the plate 20 is a stiffening member 25 that provides, in effect, the backbone of the device and is connected to the frame 15 as will later be described.

Beneath the saddle 14 is a resilient cushion or pad 26 which is mounted on the plate 20, as is seen in Fig. 6. The saddle 14 is made of leather or similar material and is slotted to slip removably over the cushion 26, providing a comfortable seat for the rider. The center portion of the body 10 is narrowed beneath the saddle 14 to provide free leg movement for the rider as is best seen in Fig. 2. To complete the outline of the horse resilient panels 27 are secured between the forward plates 22 and rear plates 24. When the rider occupies the saddle 14, the panels 27 yield inwardly to allow the rider's legs to extend substantially vertically so that he may exert the maximum propelling motion. The yieldable center panels 27 also prevent injury should the rider tumble or fall. As is shown in the partially installed position of Fig. 6, the panels 27 are split or separated near the rear end to allow movement of the frame 15.

Pivotally mounted on the head 11 is a strap 28 which extends rearwardly around the neck thereof and provides reins to be grasped by the rider. The strap 28 is made of strong metal, or other durable material which will not break under strain. The reins 28 are used to simulate the guiding of the horse, and it is therefore desirable that they be somewhat rigid.

The frame 15 is preferably of lightweight tubular construction formed in an inverted generally U shape. The forward portion of the frame 15 forms a vertical standard 30 which extends downwardly between the legs 12 to support a swiveled yoke assembly 31, and the rear portion forms a rear vertical standard 32 extending between the legs 13. Slightly forward of the center of the frame 15, a pivot support 33 is welded to the top thereof, as is seen in the detail of Fig. 8. In order to provide lateral stability, the support 33 extends outwardly from the frame 15 and has upturned end portions which are bracketed by a similar support 34 extending downwardly from the body member 25. A pivot pin or bolt 35 passes through the supports 33 and 34 to lock the body 10 firmly on the frame 15 while permitting limited relative rotation.

The frame 15 is tapered slightly upwardly towards the pivot support 33, and thus allows the body member 25 to incline downwardly along either the front or back portion of the frame. As is shown in Fig. 6, the member 25 and body 10 are inclined forwardly in the normal or unoccupied position of the device. On the bottom of the member 25 are front and rear resilient buffer pads 36 and 37, respectively, to prevent metal-to-metal contact between the body member and the frame 15.

Spring means are connected between the front body portion 21 and the bottom of the standard 30 such as a pair of strong coil springs 40, as is best seen in Fig. 7. The purpose of the spring means 40 is to balance the weight of the rider and hold the body 10 in a generally horizontal position. It is possible to vary the relationship between the location of the saddle 14 and the springs 40, but the preferred form is desirable because of the economical construction possible. A lateral bracket 41 is secured behind the lower end of the standard 30 by a clamp member 42 which frictionally engages around the standard, and is movable vertically to adjust the tension on the springs 40. Each spring 40 has a lower hook end 43 engaging the bracket 41, and a similar upper end 44 engaging an eye 45 firmly secured in the block 21.

The springs 40 urge the body 10 forwardly and downwardly about the pivot pin 35, but yield as the rider sits in the saddle 14 and permit the body 10 to move toward the position as shown in lower phantom outline of Fig. 1. By vertical adjustment of the bracket 41, the springs 40 are tensioned to hold a particular rider in a position of balance with the body 10 in a generally horizontal position intermediate its limits of pivotal movement. As will be described, the movement of the rider as he shifts his position to propel himself forward, causes the body 10 to rock back and forth about the pin 35.

The swivel yoke 31 supports the front wheel 16 by means of an axle 46 journaled between bifurcated arms 47 curved rearwardly from the standard 30. At the junction of the arms 47 a vertical spindle 48 extends upwardly from a bearing 49 in which it is rotatably mounted. The spindle 48 is of substantial length and extends within the lower end of the standard 30 to provide vertical adjustment, and elevate or lower the body 10 for different size riders. A series of spaced apertures 50 are formed in the standard 30 and are adapted to register with a similar threaded aperture (not shown) formed in the spindle 48. A threaded bolt 51 is then locked firmly into the spindle 48 to hold it in desired relationship with the standard 30.

The rear vertical standard 32 is adjustably connected to the spaced rear wheels 17 as is best seen in Fig. 4. A rod or axle 60 extends laterally outwardly to rotatably support the wheels 17 and carries a central vertical spindle 61 which extends upwardly within the standard 32. The outer ends of the axle 60 pass through a triangular brace or hanger 62 which extends upwardly and forms a rigid brace to prevent sway or rocking of the wheel assembly. The central portion of the brace 62 is twisted to form a vertically arcuate clamp portion 63 which bears firmly against the forward wall of the standard 32. Both the upper end of the spindle 61 and the clamp 63 are bored to form horizontally aligned holes through which a pin or bolt 64 is adapted to pass. The standard 32 has a series of vertically spaced holes 65 which cooperate with the bolt 64 to hold the clamp 63 and the spindle 61 in the desired vertical position. As can be understood, the rear wheels 17 are adjusted vertically in conjunction with the adjustment of the forward wheel 16 so as to elevate and lower the body 10 to accommodate different size riders.

The preferred form of the device is thus shown as a tricycle which is very stable and well adapted for use by small children. In Fig. 5 a modified form of rear wheel assembly is shown which is adapted to convert the device to a scooter or bicycle. A vertical standard 72, generally similar to the standard 32, is adjustably connected to a yoke or fork 73 by means of vertically spaced holes 74 and a bolt 75. The yoke 73 carries an axle 76 which rotatably supports a single rear wheel 77. Such a modification is easily made without changing the basic construction of the device, and has been found desirable in adapting the device for use by somewhat larger children.

The operation of the device is very simple. It will be remembered that when the rider sits in the saddle 14 the springs 40 yield sufficiently to allow the body 10 to move into a generally horizontal position intermediate its limits of pivotal movement about the pin 35. The tension on the springs 40 is adjusted by movement of the bracket 41 to properly balance the device for the weight of a particular rider. At the same time the body 10 is adjusted vertically so that the feet of the rider may easily engage the supporting surface and permit him to propel the vehicle forwardly with a scooter-like action. Because of the yieldable side panels 27, the rider may move his feet close together to obtain the maximum propelling force.

As the rider moves his feet alternatively rearwardly, he naturally and without directed effort rocks back and forth in the saddle 14. When he leans forwardly the effective moment arm of his weight about the pivot 35 is shortened and the springs 40 cause the body 10 to move forwardly. When the rider returns to an erect position, the force of the springs 40 is overcome by his increased moment arm, and the body 10 moves rearwardly. The result is an amplified harmonic motion dependent upon the activity of the rider, and increasing in frequency or gait in response thereto. As may now be fully understood, the device is especially desirable for use by small children who are unable to operate a more complex type of device.

The preferred embodiment of my invention is very economically manufactured and may be sold at a nominal cost. However, I wish it to be understood that there are many modifications of design and construction which will be obvious to those skilled in the art, and I do not wish to be limited to the details of construction herein described and illustrated, except as defined in the appended claims.

I claim:

1. A vehicle of the class described which includes: an inverted U-shaped tubular frame having a central portion upwardly convergent to a forwardly disposed pivot point; a swiveled support connected to the forward end of said frame and vertically adjustable thereon; a wheel rotatably journaled in said support; rear wheel means connected to said frame and vertically adjustable therewith; a simulated animal body pivotally mounted on the upper portion of said frame for limited movement in a vertical plane, said body being longitudinally slotted to extend downwardly around said frame and having a saddle disposed rearwardly of said pivot; resilient means mounted beneath said body and adapted to engage said frame at the limit of movement of said body; an adjustable bracket mounted on said frame near the forward end thereof and extending laterally outwardly; and a pair of coil springs extending upwardly from said bracket and connected to the forward portion of said body, whereby to substantially balance the moment arm of a rider in said saddle.

2. A vehicle of the class described which includes: an inverted U-shaped frame having a central portion upwardly convergent to a forwardly disposed pivot point; a swiveled support connected to the forward end of said frame and vertically adjustable thereon; a wheel rotatably journaled in said support; rear wheel means connected to said frame and vertically adjustable therewith; a simulated animal body having a straight base member mounted on said frame pivot point for limited movement in a vertical plane, said body having an upper head portion extending above said base member and forward and rear spaced parallel chest and flank members depending about said frame; a saddle on said body disposed rearwardly of said pivot point, and between said body members; yieldable side panels on said body extending between said forward and rear side members; resilient means mounted beneath said body base member and adapted to engage said frame at the limit of movement of said body; an adjustable bracket mounted on said frame near the forward end thereof and extending laterally outwardly; and a pair of coil springs extending upwardly from said bracket and connected to the forward portion of said body, whereby to substantially balance the moment arm of a rider in said saddle.

3. A vehicle of the class described which includes: an inverted U-shaped frame having a central portion upwardly convergent to a forwardly disposed pivot point; a swiveled support connected to the forward end of said frame and vertically adjustable thereon; a wheel rotatably journaled in said support; rear wheel means connected to said frame and vertically adjustable therewith; a simulated animal body having a substantially flat base member with an upper head, and front and rear spaced parallel chest and flank members depending therefrom; yieldable side panels on said body extending between said forward and rear side members; pivot means connecting said frame and said body to allow limited movement of the latter in a vertical plane, said means including a laterally extending upwardly turned support mounted on said frame pivot point, a laterally extending downwardly turned support mounted on said body base member and a pin interlocking said supports; a saddle on said body longitudinally spaced from said pivot point, and between said body members; and spring means extending upwardly from said frame and connected to a point on said body opposed to the location of said saddle and spaced from said pivot, whereby to substantially balance the moment arm of a rider in said saddle.

4. A vehicle of the class described which includes: an inverted U-shaped tubular frame having a central portion upwardly convergent to a forwardly disposed pivot point; a swiveled yoke having an upper spindle engaging the forward end of said frame and vertically adjustable therein; a wheel rotatably journaled in said yoke; a rear axle assembly having an upper spindle engaging the rear end of said frame and vertically adjustable therein; a wheel rotatably mounted on said rear axle assembly; a simulated animal body having a straight base member mounted on said frame pivot point for limited movement in a vertical plane, said body having an upper head portion extending above said base member and forward and rear spaced parallel chest and flank members depending about said frame; a saddle on said body disposed rearwardly of said pivot point, and between said body members; and adjustable spring means connected between the forward portion of said frame and a point on said body located to substantially balance the moment arm of a rider in said saddle.

5. A vehicle of the class described which includes: an inverted U-shaped tubular frame having a central portion upwardly convergent to a forwardly disposed pivot point; a swiveled yoke having an upper spindle engaging the forward end of said frame and vertically adjustable therein; a wheel rotatably journaled in said yoke; a rear axle assembly having an upper spindle engaging the rear end of said frame and vertically adjustable therein; a wheel rotatably mounted on said rear axle assembly; a simulated animal body having a substantially flat base member with an upper head portion and front and rear spaced parallel chest and flank members depending therefrom; a saddle on said body disposed rearwardly of said pivot point, and between said body members; yieldable side panels on said body extending between said forward and rear side members; pivot means connecting said frame and said body to allow limited movement of the latter in a vertical plane, said means including a laterally extending upwardly turned support mounted on said frame pivot point, a laterally extending downwardly turned support mounted on said body base member and a pin interlocking said supports; resilient means mounted beneath said body base member and adapted to engage said frame at the limit of movement of said body; an adjustable bracket mounted on said frame near the forward end thereof and extending laterally outwardly; a pair of coil springs extending upwardly from said bracket and connected to the forward portion of said body, whereby to substantially balance the moment arm of a rider in said saddle; and a rein strap mounted on said body substantially above said yoke.

AMY C. CREASEY.

REFERENCES CITED

The following references are of record in the file of this patent:

UNITED STATES PATENTS

| Number | Name | Date |
| --- | --- | --- |
| 1,317,475 | Bell | Sept. 30, 1919 |
| 1,389,854 | Bradway | Sept. 6, 1921 |
| 1,592,036 | Merriman | July 13, 1926 |
| 1,795,678 | Raphael | Mar. 10, 1931 |

FOREIGN PATENTS

| Number | Country | Date |
| --- | --- | --- |
| 277,394 | Italy | Sept. 8, 1930 |
| 733,469 | France | July 11, 1932 |